(12) United States Patent
Vanker et al.

(10) Patent No.: US 7,711,603 B2
(45) Date of Patent: May 4, 2010

(54) METHOD AND SYSTEM FOR TRANSFERRING INFORMATION BETWEEN MULTIPLE BUYERS AND MULTIPLE SELLERS

(75) Inventors: David Vanker, Troy, MI (US); Thaddeus O. MacKrell, Grosse Pointe, MI (US)

(73) Assignee: Owens & Minor Distribution, Inc., Glen Allen, VA (US)

( * ) Notice: Subject to any disclaimer, the term of this patent is extended or adjusted under 35 U.S.C. 154(b) by 0 days.

(21) Appl. No.: 11/823,589

(22) Filed: Jun. 28, 2007

(65) Prior Publication Data

US 2008/0015958 A1  Jan. 17, 2008

(51) Int. Cl.
G07G 1/12 (2006.01)
G07G 1/00 (2006.01)
G06F 17/30 (2006.01)
G06Q 10/00 (2006.01)
G06Q 40/00 (2006.01)

(52) U.S. Cl. .................. 705/24; 705/10; 705/14; 705/28; 705/37

(58) Field of Classification Search .................. 705/10, 705/14, 28, 37, 241
See application file for complete search history.

(56) References Cited

U.S. PATENT DOCUMENTS

| | | | | |
|---|---|---|---|---|
| 4,992,940 A * | 2/1991 | Dworkin | ............... | 705/26 |
| 5,671,362 A * | 9/1997 | Cowe et al. | ............... | 705/28 |
| 5,712,990 A * | 1/1998 | Henderson | ............... | 705/28 |
| 5,991,728 A * | 11/1999 | DeBusk et al. | ............... | 705/2 |
| 6,012,041 A * | 1/2000 | Brewer et al. | ............... | 705/28 |
| 6,115,649 A * | 9/2000 | Sakata | ............... | 700/241 |
| 6,204,763 B1 * | 3/2001 | Sone | ............... | 340/568.1 |
| 6,246,994 B1 * | 6/2001 | Wolven et al. | ............... | 705/14.39 |
| 6,260,024 B1 * | 7/2001 | Shkedy | ............... | 705/37 |
| 6,366,829 B1 * | 4/2002 | Wallace | ............... | 700/236 |
| 6,418,441 B1 * | 7/2002 | Call | ............... | 707/10 |
| 6,490,567 B1 * | 12/2002 | Gregory | ............... | 705/39 |
| 6,673,479 B2 * | 1/2004 | McArthur et al. | ............... | 429/12 |
| 6,741,968 B2 * | 5/2004 | Jacoves et al. | ............... | 705/14.23 |
| 6,850,900 B1 * | 2/2005 | Hare et al. | ............... | 705/26 |
| 7,475,024 B1 * | 1/2009 | Phan | ............... | 705/26 |
| 2003/0033205 A1 * | 2/2003 | Nowers et al. | ............... | 705/26 |
| 2005/0149378 A1 * | 7/2005 | Cyr et al. | ............... | 705/10 |

OTHER PUBLICATIONS

Weil, Marty;"Warehousing Wonders", Jan. 1998, Manufacturing System, vol. 16, No. 1, pp. 60-66.*
Morrissey, John; "Providers put faith in Internet; Web-based software applications improve costs and clinical performance, but have limits"; Mar. 6, 2000; Modern Healthcare; vol. 30, p. 64.*

* cited by examiner

Primary Examiner—Matthew S Gart
Assistant Examiner—Talia Crawley
(74) Attorney, Agent, or Firm—Winston & Strawn LLP

(57) ABSTRACT

A method for transferring information between multiple buyers and multiple vendors is provided. Information is received from a plurality of sources. This information corresponds to a plurality of products. This information is stored in a first database. A request is received. The request concerns a portion of the information stored in the first database. The request is then retrieved from the first database and posted to a second database. Access is provided to subsets of the second database to a plurality of subscribers.

21 Claims, 9 Drawing Sheets

FIG. 6

2-Dimensional Data Table

FIG. 7

"Tree"-form Hierarchical
Data Table

FIG. 8

| | | Low Threshold | Over Threshold | |
|---|---|---|---|---|
| Low Stock 410 | Low Stock | | | |
| | Low Stock | | | |
| Over Stock 420 | | | | Over Stock |
| | | | | Over Stock |
| Low Stock Watch List 430 | Low Stock Watch List | | | |
| | | Low Stock Watch List | | |
| Over Stock Watch List 440 | | Over Stock Watch List | | |
| | | | | Over Stock Watch List |
| On Order 450 | | On Order | | |
| | | | On Order | |

☐ - Quantity    ▨ - Quantity + Quantity_On_Order

Par Level

METHOD AND SYSTEM FOR TRANSFERRING INFORMATION BETWEEN MULTIPLE BUYERS AND MULTIPLE SELLERS

APPLICATION HISTORY

This Application claims the benefit of U.S. Provisional Patent Application Ser. No. 60/262,182, filed on 17 Jan. 2001 and entitled "Method and System for Transferring Blood-Related Information Between Multiple Buyers and Multiple Sellers of Blood," and U.S. Provisional Patent Application Ser. No. 60/262,184, filed on 17 Jan. 2001 and entitled "Method and System for Transferring Inventory Information Between Multiple Buyers and Multiple Sellers."

FIELD OF THE INVENTION

The present invention generally relates to the field of information transfer and, more specifically, to a method and system for transferring information between multiple buyers and multiple vendors.

BACKGROUND OF INVENTION

Traditional inventory management systems were internally focused (i.e., only concerned about a particular customer or a particular vendor), and insight into inventory on hand was limited to each party's own staff. As a result, inventory management systems for both customers and vendors were limited to managing current stock on hand and alerting responsible parties when to re-order certain products. Any visibility into a customer's inventory level by a vendor or a vendor's stocking level by a customer was established through a specific arrangement and proprietary computer system integration.

Another obstacle was that, in most vendors' and most customers' internal systems, inventory, production, sales management, billing, etc. were very often based on many separate computer systems. These systems lacked the standardization afforded by a common communicative language, one that would enable an efficient data exchange. Furthermore, this lack of standardization prevented not only vendors from proactively managing their customers, but also prevented different departments of the same customer from accurately viewing product stocking and consumption rates.

There is, therefore, a need to provide a method and system for transferring information between multiple buyers and multiple sellers that overcomes the above-stated disadvantages.

SUMMARY OF THE INVENTION

The present invention provides an industry-wide, multi-party inventory management system. The system of the present invention comprises a collective view of the inventory levels within an entire market while extending the "just in time" inventory practices of each manufacturer to the point of consumption through the deployment of "point of use" level data capture devices and a central database. Individually established product re-supply level points are used by the central database's operating system to trigger a vendor's re-supply and billing mechanisms. Licensed access by a manufacturer sales or service representative in the field, coupled with the use of similar data collection devices, enables the management of truck stock inventory and the corresponding product visibility with regard to location, type and disposition. Furthermore, the optimization of the product at the point of use is made possible by licensed access for a vendor and their ability to use the present invention and supporting decision tools to move the necessary inventory to the optimal or immediate point of consumption. Since the needs of each customer is different, the present invention allows individual vendor and customer licensors to set mutually agreed-upon inventory levels which satisfy the operational requirement for each customer, while avoiding excessive stocking by either party.

The present invention is thus designed to invigorate and optimize the general commercial activities of participating industries. Beyond simple inventory consumption triggers and product level analysis, the present invention provides a platform for the easy collection and dissemination of a wide range of commerce-related information throughout an industry, without burdening any party with more than a single, direct interface to all other parties. Furthermore, intelligent controls limit access by each individual while mutually agreeable licensing agreements and syndicate arrangements allow each vendor and customer to control the expansion and participation of parties in the model.

BRIEF DESCRIPTION OF THE FIGURES

FIG. 6 illustrates an example of a two-dimensional data table, as used in the system of FIG. 2;

FIG. 7 illustrates an example of a vertical and hierarchical data trees, as used in the system of FIG. 2;

FIG. 8 is a table illustrating user-determined thresholds, for use in the system of FIG. 2.

DETAILED DESCRIPTION OF THE PRESENTLY PREFERRED EMBODIMENTS

Figure 1:
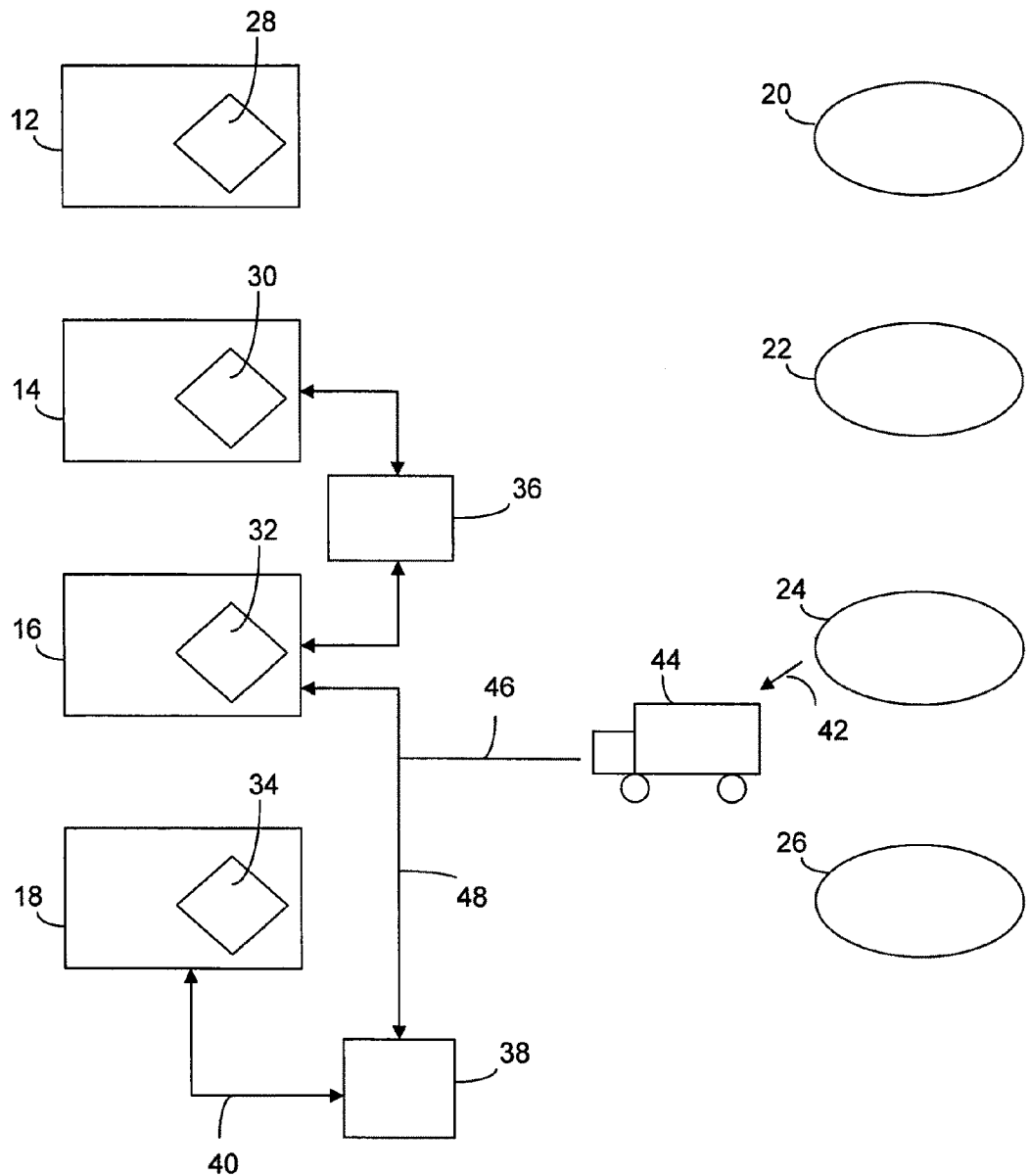
FIG. 1 is a schematic diagram of the current environment of an inventory management system.

The present invention relates to a community- or market-wide, multi-contributor, pooled inventory system that enables all licensed parties to have selective access to data elements. The data elements preferably relate to various aspects of a particular industry. In turn, access to the data elements enable the licensed parties to effect specific actions concerning the data elements, such as, for example, automated re-supply, billing, consignment, truck stock management, service, marketing, general communication improvements, etc. The present invention may be managed by one of the market participants or, alternatively, by an independent third party.

Shared visibility into product parameters—such as quantities, locations, expiration dates, arrival dates, delivery status, point of origin, etc.—between multiple buyers on one hand and multiple sellers on the other relies on a coordinated and common system between the parties. "Coordinated" in the above phrase means built and maintained to serve particular subsets of relevant data to the respective parties, with features that both add value on either end of the equation (distinctly for buyers and sellers) and provide protection for the parties' internal data. The coordination of data gathering, storage, sharing, and value-added manipulation between multiple independent buyers and suppliers (or distributing and receiving entities in the case of a single organization) is the essence of this invention. The preferred embodiment of a coordinator in this invention is the host and ongoing administrator of an electronic repository of data and software tools that together constitute a software application, also known as an application service provider (ASP). "Common," as used above, means available to both the parties, as part of their current (or an easily obtainable) internal system for transmitting, manipulating and viewing information, and based on communication standards supported on both ends of the transaction. The preferred embodiment of a common system for communication is, in this case, the Internet or any similar communication system.

The processes covered by this invention may be grouped into generic features (such as security) and two independent cycles (for buyers and sellers), with several points of intersection. Elements of these cycles—selected features that add value for users of the system by enhancing insight into inventory disposition and related commercial activity—are not new. The invention's innovations lie in the particular processes that make the data valid, comprehensible and useful to parties on opposite ends of a transaction and in the cumulative effect—real-time, shared visibility into inventory at the point of use or sale, forming an industry-wide, multi-party inventory management system.

By enabling the multi-customer collection and pooling of inventory, the present invention permits an entire vertical market of customers having similar interests to take advantage of higher levels of service from an unlimited number of vendors and distributors, including widespread consignment inventory practices.

Furthermore, by pooling data contributions from multiple customers and by allowing vendors to view and interpret specific data as it relates to certain rules of access, the present invention foregoes the need for each individual customer to have a computer connection to each vendor or distributor. Thus, from either the vendor or distributor perspective, the multi-customer pooled data provides insight and enables action with regard to individual customers, but also foregoes the traditional requirement of having a specific link or intermittent query of each individual customer.

Furthermore, the present invention enables an extension of "just in time" manufacturing practices through to the point of consumption. This increased visibility on product stocking levels enables the participating manufactures to optimize available product across the entire market, to view field agent's trunk supply, to move product throughout the market in order to minimize excess manufacturing, to review consumption of critical supply and to manage customer consignment programs.

To this end, a "many to many" method and apparatus for the syndication of inventory and associated data between two or more parties via a computer system or systems managed by one of the parties or by a third, independent party through an "all parties" licensing arrangement is provided by the present invention. According to the present invention, competitive manufacturers or suppliers of product obtain licensed access to a database which contains continuously updated condition and consumption information on their products provided by the market consumers via barcode readers or like systems. Additionally, the central database managing licensor accepts inventory data from licensees and then assembles, sorts and feeds back a collection of the relevant data to all engaged parties in the arrangement to include product manufactures and their agents, as well as producers, distributors, testers and consumers or users.

Data contribution can also include information from the manufacturer or distributor to the customer on the status of product which is in route to the customers location, as well as information on pricing, billing, account status, product recalls, marketing and the like. Although commerce can be executed through the system, the present invention is primarily designed to collect and organize data which optimizes the entire commercial process, but is not limited to one element, such as, for example, the product selection or purchase.

To that end, licensing parties might also include other commerce facilitators such as group purchasing organizations and industry-wide communication exchanges (e.g., Internet exchanges). These organizations may license information regarding the continuous flow of product between the customers and the vendors or distributors in order to enable such activities as charge-back programs, volume discounting, contract compliance analysis and the like.

The "many to many" inventory data syndication model, as promulgated by the present invention, is primarily designed to enable multiple common customers of the same groups of vendors or distributors to avoid the requirement of multiple unit of use collection systems and multiple interfaces to vendor order fulfillment systems. Likewise, from a vendor's or distributor's perspective, the present invention limits the required number of customer interfaces from one for each customer to one for the entire engaged market. As a result, the present invention pertains to a wide variety of markets. However, it is of particular benefit in markets where full integration and use of standardized product coding and or communication languages is lacking. This absence of standardization may be due to a dearth of industry focus, competitive positions of suppliers or a lack of available technology skills at the customer end. Furthermore, the present invention applies particularly well in markets where the material being produced, sold, distributed, controlled, managed, tracked and/or consumed is subject to one or more of the following characteristics:

The items are labile in nature or subject to obsolescence;
The items can be labeled with incremental information regarding newly revealed characteristics while awaiting consumption, thus essentially changing their identity;
The items can be moved between various points of use in order to avoid spoilage and to optimize supply;
The items can be part of a consignment inventory arrangement; and
The items may be managed by a central database-type system of syndicated information which is then provided to various contributing and consuming parties via a licensing relationship.

FIG. 1 illustrates a schematic diagram of the current environment of an inventory management system 10. For purposes of the example shown in FIG. 1, it will be assumed that the industry in question concerns the supply and distribution of implanted medical devices. Alternatively, the inventory management system described here may be applicable to other products. Such products include, for example, blood and blood-related components (i.e., plasma, retics, red blood cells, white blood cells, etc.), body organs for transplant (i.e., eyes, kidneys, skin, livers, lungs, hearts, etc.), bone marrow and related components, genetic material (i.e., cells, DNA, RNA, eggs, semen, etc.), limbs, (i.e., fingers, hands, toes, legs, arms, ears, etc.), hair and follicles, implanted and external bodily function support or monitoring devices (i.e., pumps, pacemakers, prosthetics, ocular devices, stents, etc.) and organic compounds (i.e., cloned organisms, cells, organs, animals, etc.). The inventory management system may also include veterinary (i.e., non-human) applications for all the medical items listed above. Additionally, the inventory management system may be directed to non-medical labile or "time-sensitive" products, such as cattle, poultry, raw meat and seafood, prepared meat and seafood, wild animals, dairy products, other non-meat prepared foods, plants, flowers, grain, seeds, water, ice, wine, beer, liquor, lumber, apparel and footwear, home furnishings, seasonal goods, toys, reading materials, computers and electronics, packaged software, appliances, hardware, home improvement supplies, industrial supplies, gases, organic fuels and lubricants (i.e., oil gasoline, etc.) and genetically-altered components.

Referring to FIG. 1, users of implantable medical devices 12, 14, 16, 18, mainly hospitals, order supplies from a plurality of suppliers 20, 22, 24, 26. The suppliers 20, 22, 24, 26 may sometimes be under contract with the users 12, 14, 16, 18. Generally, the users 12, 14, 16, 18 will additionally have a storage area 28, 30, 32, 34. The storage areas 28, 30, 32, 34 preferably store, inventory and match the products to patients. The storage areas 28, 30, 32, 34 may be an internal department within a particular user, as shown; may be shared between two users (as illustrated by reference numeral 36); or outsourced to a third party (as illustrated by reference numeral 38).

The third party storage area 38 may even be an independent product supplier offering an additional service. In such a case, the third party supplier 38 may employ agents (as shown by the line referenced by numeral 40) to deliver the product to the user 18 when ordered. In all cases, however, the user's staff communicates frequently (as shown by the line referenced by numeral 42) with the supplier 24 regarding the inventory needed at the user's facility. As required, agents 44 may be dispatched to move products to users (as shown by the line referenced by numeral 46) or between users (as shown by the line referenced by numeral 48) to address a need or to optimize the late-dated supply of a certain product.

In all cases, communication on a continuous basis does not exist between blood suppliers 20, 22, 24, 26 in the users 12, 14, 16, 18 or the blood suppliers 20, 22, 24, 26 concerning the level, type, availability, dating, disposition and other pertinent details of the product.

At all relevant points within system 10, some portion of information regarding the availability, status, disposition, dating and other pertinent details on the blood supply may be available. However, no system links these disparate points of information in an organized, reliable and accessible manner. As a result, significant energy, resources, time and supplies are wasted in the current model.

Figure 2:
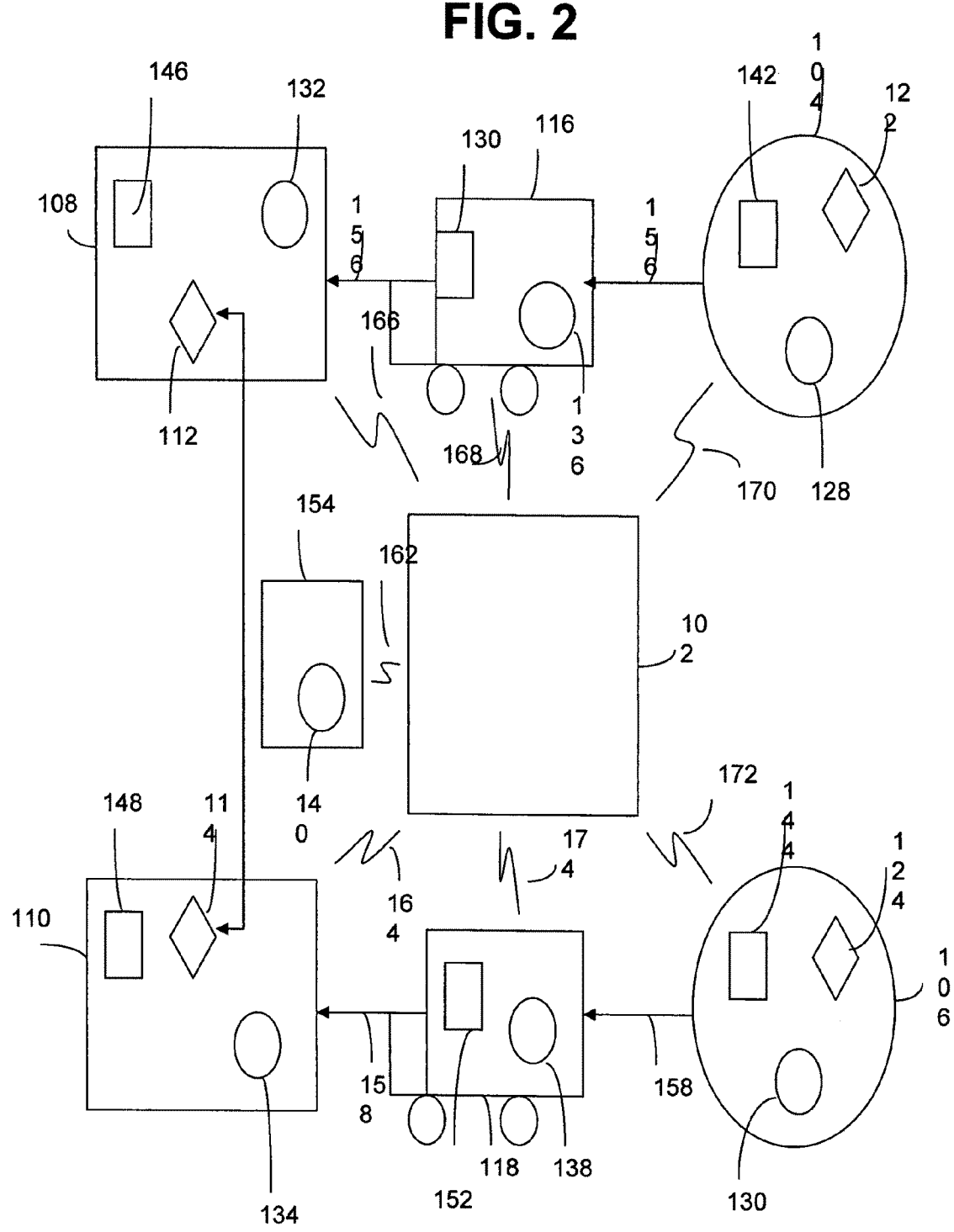
FIG. 2 is a schematic diagram of one embodiment of an inventory management system, in accordance with the present invention.

FIG. 2 illustrates a schematic diagram of one embodiment of an inventory management system 100 of the present invention. For purposes of the example shown in FIG. 2, it will be assumed that the industry in question concerns the supply and distribution of implantable medical devices. Alternatively, the inventory management system described here may be applicable to other products. Such products include, for example, blood and blood-related components (i.e., plasma, retics, red blood cells, white blood cells, etc.), body organs for transplant (i.e., eyes, kidneys, skin, livers, lungs, hearts, etc.), bone marrow and related components, genetic material (i.e., cells, DNA, RNA, eggs, semen, etc.), limbs, (i.e., fingers, hands, toes, legs, arms, ears, etc.), hair and follicles, implanted and external bodily function support or monitoring devices (i.e., pumps, pacemakers, prosthetics, ocular devices, stents, etc.) and organic compounds (i.e., cloned organisms, cells, organs, animals, etc.). The inventory management system may also include veterinary (i.e., non-human) applications for all the medical items listed above. Additionally, the inventory management system may be directed to non-medical labile or "time-sensitive" products, such as cattle, poultry, raw meat and seafood, prepared meat and seafood, wild animals, dairy products, other non-meat prepared foods, plants, flowers, grain, seeds, water, ice, wine, beer, liquor, lumber, apparel and footwear, home furnishings, seasonal goods, toys, reading materials, computers and electronics, packaged software, appliances, hardware, home improvement supplies, industrial supplies, gases, organic fuels and lubricants (i.e., oil gasoline, etc.) and genetically-altered components.

The inventory management system 100 may preferably include a computer algorithm program and software, which may be stored integral with, or remote from, a central database 102. The computer algorithm program may preferably comprise any program capable of being stored on an electronic medium, such as, for example, RAM or ROM, and permitted to be accessed (and consequently run) by microprocessor (not shown), preferably running integral with, or remote from, the central database 102. Alternatively, the software running inventory management system 100 may be performed manually by a programmer, electronically programming instructions to the inventory management system 100, either remotely from a location away from the inventory management system 100, or via an electronic connection with the inventory management system 100.

Referring to FIG. 2, the embodiment of the inventory management system 100 of the present invention comprises a model and apparatus for the inventory management and distribution of implantable medical devices. In the embodiment shown, key information, such as the status, disposition, availability, price, age, etc. is contained in a single, multi-user, independent location, such as a database 102. Furthermore, the database 102 may be accessed by all parties appropriately involved in the transaction of each unit of product.

Referring to FIG. 2, the fundamental change from the present market picture (i.e., FIG. 1) is the addition of the independently maintained database 102. As seen in FIG. 1, the present market picture is a competitive model that does not afford ease of communication between market suppliers or customers concerning the status of the product. This creates waste and excessive effort to communicate effectively regarding the supply.

By contrast, referring to FIG. 2, the present invention provides a central point of information 102, accessible by all (subject to certain rules), without disturbing the existing market structure. There are still suppliers 104, 106 who compete for users 108, 110. Product is still brought to the user's facilities 112, 114 by shippers 116, 118. Suppliers 104, 106 still manufacturer products and hold it in their warehouse locations 122, 124 awaiting approval to distribute. Some suppliers 104, 106 may choose to place part of their supply at the hospital on consignment 126, which is enabled and easily managed through the present invention.

Another element of the model is the proliferation of data access and/or viewing devices 142, 144, 146, 148, 150, 152 that enable all parties to see their data on their supply. These devices can be as varied as phones, pages, PDAs, computers, Internet browsers, etc. These devices communicate with the central independent repository 102 via communication links 164, 166, 168, 170, 172, 174—importantly, without need for a specific and proprietary communications protocol; rather, they rely on the standard communications protocol used to connect with this common communications platform (a preferred embodiment is the Internet). Another change to the market model is the addition of information collection devices (e.g., bar-code scanners) 128, 130, 132, 134, 136, 138, 140, which are interfaced to a network which is in turn connected to the database via the Internet or other network (e.g., wireless). As indicated in FIG. 2, these devices 128, 130, 132, 134, 136, 138, 140 are widely deployed throughout the invention to collect data on a continuous basis.

The use of various data collection devices 128, 130, 132, 134, 136, 138, 140 and data viewing devices 142, 144, 146, 148, 150, 152 by all significant players in the supply chain enables the constant updating of the central independent repository 102. This system provides critical, and previously unavailable, information to the individuals, who can use the data in a proactive manner to optimize the blood supply.

Although traditional service contracts between suppliers and customers continue to exist in the current invention, the invention enables new parties 154, e.g., industry analysts, to easily gain a consolidated view of the product status, availability and disposition. In addition, the model allows rules of access to govern the availability of information between market players (i.e. between neighboring hospitals) so that they can support one another's needs. Likewise, the rules of access can permit two affiliated suppliers to view each other's supply status while maintaining as proprietary the sources of that supply 120. Finally, although the various suppliers remain independent, the access rules that are a part of the invention can permit all parties to optimize the supply that is in the channel. For example, the invention enables all supplier representatives 116, 118 to use their data retrieval systems 136, 138 to move supply between hospitals (as referenced by lines 156, 158, 160), while appropriately tracking ownership for payment purposes.

In operation, this invention eliminates the product waste and excessive and laborious communication and product shuffling effort associated with the current market model.

Figure 3:
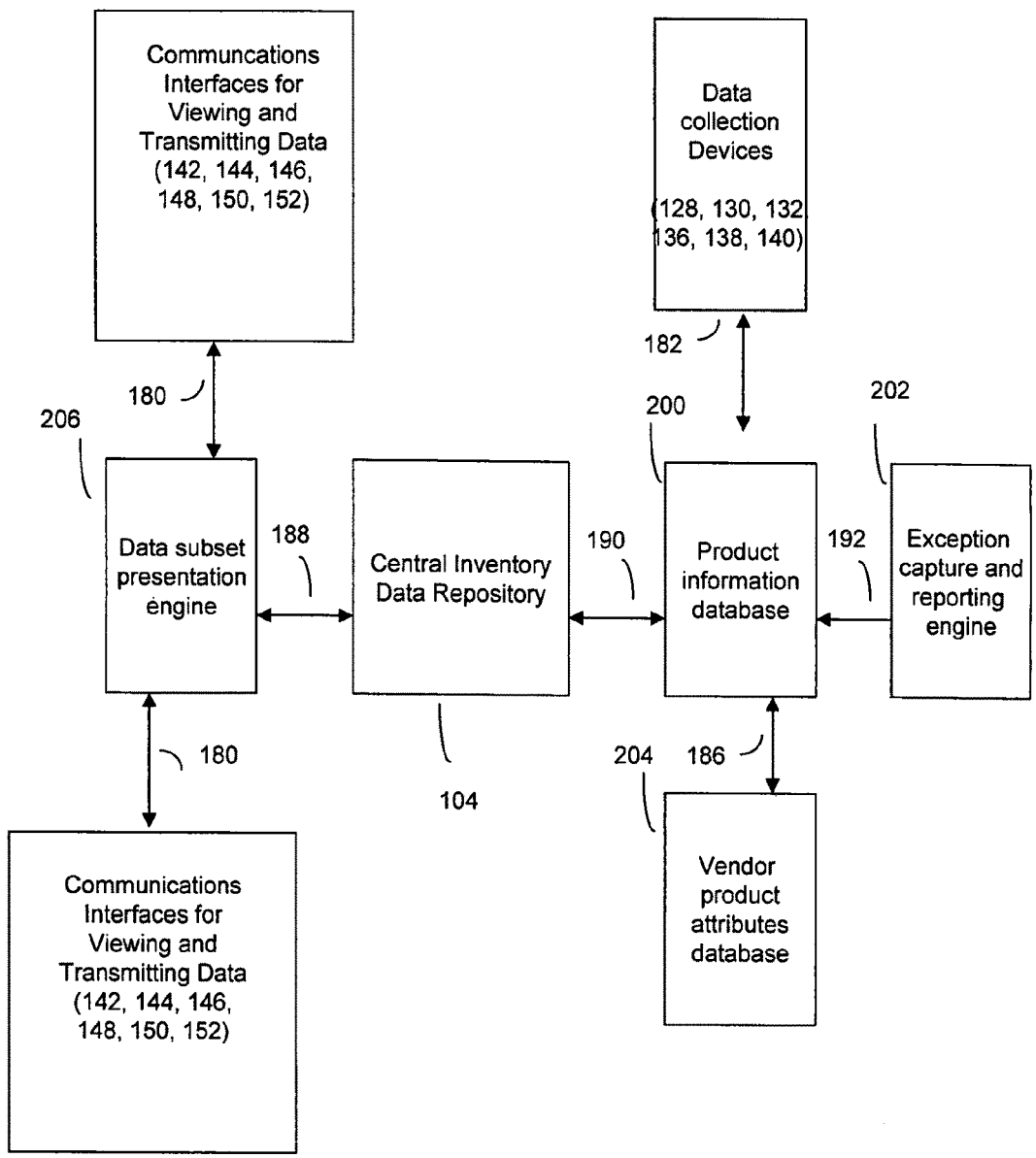
FIG. 3 is a flow chart illustrating the basic function of the system of FIG. 2.

FIG. 3 illustrates the basic function of the present invention. A data collection device 128, 130, 132, 136, 138, 140 acquires information in the form of a code (an example is the alphanumeric code indicated by a barcode). The code is communicated via computer link 182 to a central Product Information Database 200, which associates product attributes with the alphanumeric code. The Product Information Database 200 is updated by periodic communication via computer link 186 with a plurality of Vendor Product Attributes Databases 204, maintained separate from the Product Information Database 200 by a plurality of vendors or suppliers. When the Product Information Database 200 can't identify a code, it communicates the problem to the Exception Capture and Reporting Engine 202 to be addressed and corrected. The Product Information Database 200 continuously communicates via computer link 190 with a Central Inventory Data Repository 104. The difference between the two databases is that the Product Information Database 200 is a record of single-instance product information regarding a plurality of products, and is not modified by exchanges with the Data Collection Device 128, 130, 132, 136, 138, 140.

The Central Inventory Data Repository 104, on the other hand, maintains a dynamic record of multiple instances of a single product information code, in order to track product totals.

When a Communications Interface for Formatting and Viewing Data 142, 144, 146, 148, 150, 152 (one embodiment is an Internet browser) requests a data subset, the request goes via computer link 180 to a Data Subset Presentation Engine 206. According to pre-selected parameters, the Data Subset Presentation Engine 206 acquires data via a communications interface 188 from the Central Inventory Data Repository 104, and presents the data subset via a communications interface 180 through a Communications Interface for Formatting and Viewing Data 142, 144, 146, 148, 150, 152.

Figure 9:
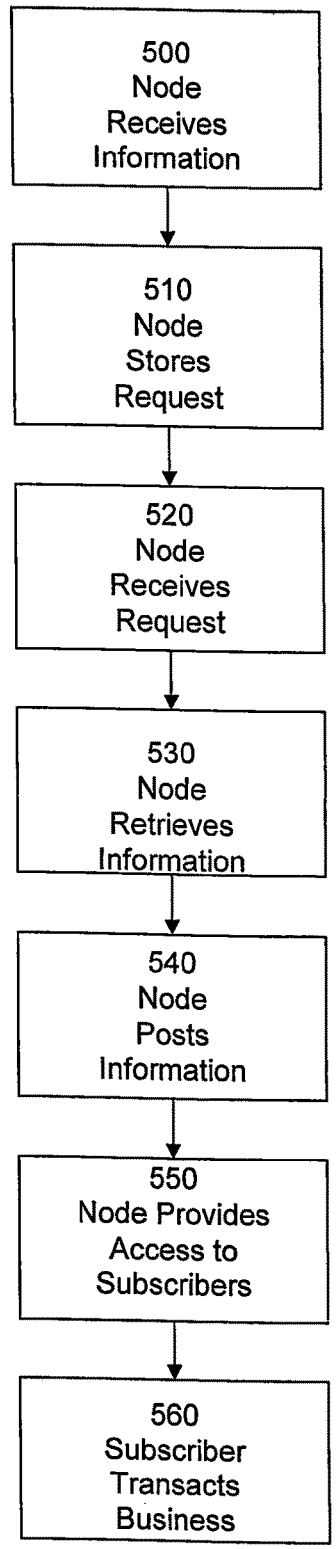
FIG. 9 is a flowchart illustrating a method for transferring information between multiple buyers and multiple vendors, in accordance with the system of FIG. 2.

Referring to FIG. 9, a method for transferring information between multiple buyers and multiple vendors is illustrated. In Block 500, a central node receives various information corresponding to a plurality of products. This information is preferably transmitted to the node electronically, but may be by any other suitable means providing for the transfer of information. Additionally, the information is preferably sent to the node from a plurality of independent sources. Preferably, these independent sources are suppliers of a particular product (i.e., vendors). For example, a vendor may supply information to the node regarding specific details about the product controlled by vendor, such as, for example, amount of product, size of product, cost of product, etc.

Upon receiving the information, in Block 510, the node then stores this information in a first database.

In Block 520, the node then receives a request for information. Preferably, this request may come form at least one user (or, more specifically, would-be-user) of the product stored in the first database. For example, a buyer may inquire to the node as to the status of a particular product.

In Blocks 530 and 540, the node retrieves the requested information from the first database and posts the information to a second database.

In Block 550, the node provides access to the second database to a plurality of subscribers. That is, according to a particular subscriber's account, the node allows access to the second database. This method of selective allowance to the database is preferably based on a number of security measures that allow restricted access to certain databases of information. Additional measures include, for example, login names and/or passwords. Thus, if a subscriber is allowed to access a particular database for information relating to a particular product, that subscriber (whether a vendor or a buyer) may be permitted to view the information contained in the second database. In most cases, the subscriber may be the same person or entity as the person or entity making the request for information in Block 520. However, such is not a requirement, and a subscriber may be different from the requestor. Assuming the subscriber meets the security requirements, the subscriber is permitted access to the second database.

Upon accessing the second database, the subscriber may transact business with a particular vendor or buyer dealing in the product that is the subject of the information contained on the second database. This is shown in Block 560.

What follows is a detailed description of the software components and processes of the system of the present invention. The term "page" as used in the following detailed system description refers to a discrete interface for information presentation or interaction. A single process involving multiple steps may encompass many pages, but not every step requires that a separate page be presented to the user (many steps are carried out internally, without presentation or interaction with the user).

Open Network Model. This invention relies on the participating entities having a common platform of communication (the preferred embodiment for this invention is the Internet).

Figure 4:
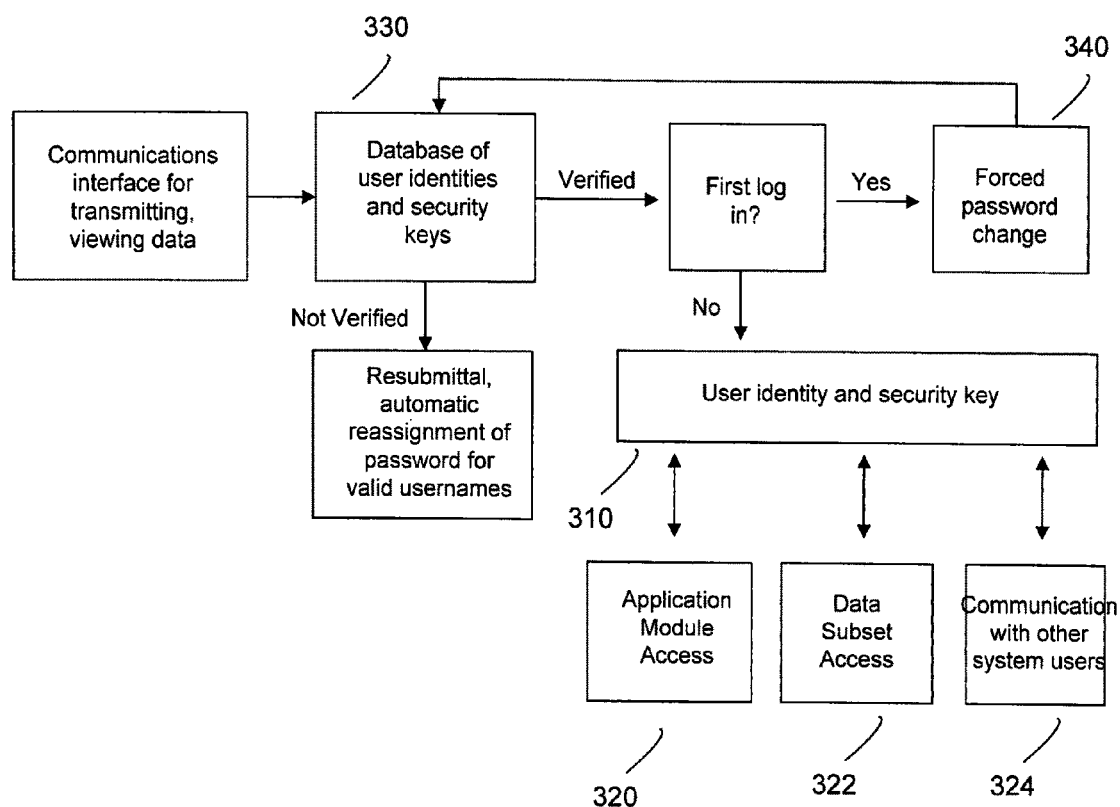
FIG. 4 is a flow chart illustrating the security and access control component of the system of FIG. 2.

Security and Access Control. The invention's implementation of data security and user identification is critical to assembling and providing access to specific data subsets, based on each users relationship to the community or market employing the system. This system component is illustrated in FIG. 4.

1. Log In
    1.1. Username and password protection. A coordinator or "host" creates and maintains a data record (preferred embodiment: an electronic database accessible over the Internet) of valid user identification codes (usernames) and user passwords. Unique user passwords, encrypted in the system so that they are unknown even to the host, are critical to this invention, in that they provide the means of delineating relevant tools and bodies of data to be presented to the user, in exclusion of other tools and data that the user is not authorized to access.
    1.2. Forced Password Change 340 on first log in. Users are required to create a new password, unlike the current one, any time they log in for the first time with a new or system-issued replacement password. This prevents access by anyone who discovers a user's initial password issued by the system (for example, via e-mail). The invention uses a database "flag" to determine whether the user has every logged in before and resets this flag whenever a new password is created for the user.
    1.3. "Module"-level security checking. Modules are discrete features or portions of features deemed sufficiently distinct to warrant independent security protection. A user's access to each module is denied by default unless specifically permitted by the coordinator. Users themselves may select and modify their own roles but may not alter the relationship between any role and any module; this privilege is reserved for the coordinator.
    1.4. Roles and permissions. Users' roles define their general function, position or "need to know" for purposes of the invention. Roles correspond to the aforementioned security keys, in that they determine which users have access to which modules (system features). Permissions govern which roles have access to which modules. Each user has one or more roles. Each module is accessible by those users whose roles have the appropriate permission.
    1.5. User identity and security keys 310. Multiple elements of user's online identity are communicated constantly throughout a user's interaction with the software, determining Application Module Access 320, Data Subset Access 322, and rights for Communication With Other System Users 324. While a user is in communication with the invention, all user activity is governed by the users identity and the users "security key." The system obtains these elements from the Database of User Identities and Security Keys 330 in connection with the username and password. Once the users username and password are validated against the database and the corresponding security key and user identity are obtained, a "session" with the system may proceed. The users security key is a general identification grouping that determines whether the user has access to a feature, function, area or page within the application (see Roles and Permissions under Section 2.2). The users identity is unique to the user but also includes parameters this user shares with others in the same organization (i.e., the identity of Jane Smith, employee of SupplierA Inc., includes elements that identify her uniquely as Jane Smith and generally as an employee of SupplierA Inc.). This provides unique access to data sets such as her password change input section and shared access to the specific data set that this invention reserves for ABC Inc. The combination of security key and user identity determines what the user can access, view, and manipulate within this system. A sample of code for determining and acting on a users identity and security keys upon arrival at a new page (one embodiment is Active Server Pages, or ASP language, employed largely in the development of Internet-based applications) is as follows:

```
if not IsUserAllowed("ModuleName", ALLOW_VIEW)
then
      response.Redirect "not_allowed.asp"
      response.End
end if
```

In other words, if the role to which a user has been assigned does not having "viewing" permission to a module called ModuleName, then that user is redirected away from the page or feature of the system to which he or she was seeking access.

Passing of this data to the system is at no time visible to or affected by the user: it occurs by virtue of a repeated verification of user identity and security key as stored, temporarily, on the user's own communication device. The preferred embodiment of the present invention is an encrypted token or cookie, placed on the user's device by the system, and being automatically deleted upon manual or automatic termination of the user's session (see Section 2). Direct access to or manipulation of either the security keys or identities by users is not permitted.

Figure 5:
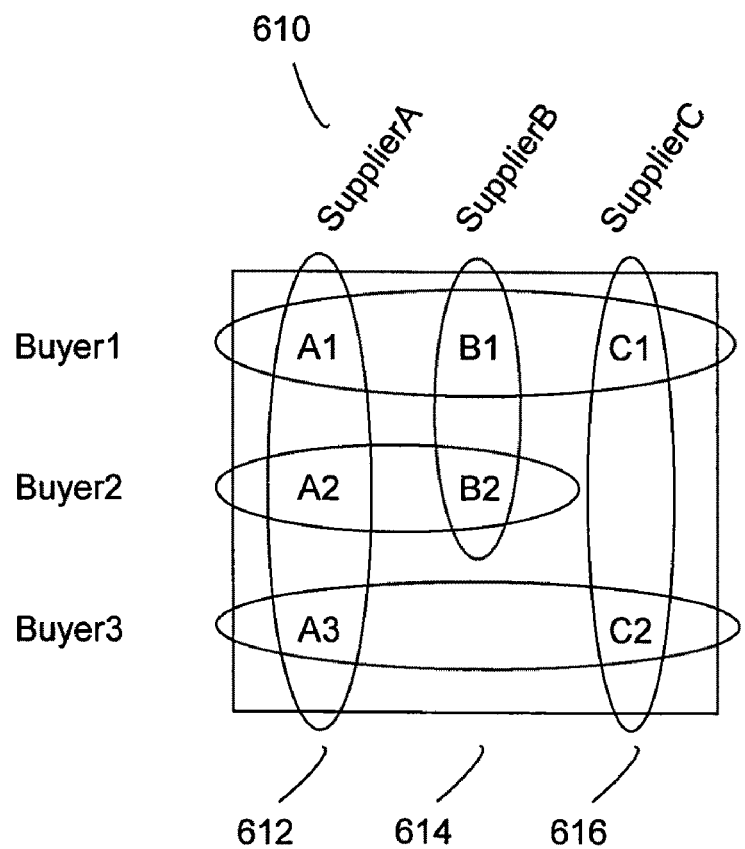
FIG. 5 illustrates an array highlighting a dynamic creation of customized data sets, according to the system of FIG. 2.

A further example is the dynamic, on-the-fly creation of customized data sets according to certain parameters of users' identities. The preferred embodiment of the present invention uses a Microsoft SQL database. So, for example, a user may be identified partly as having employerID=SupplierA. Because the user's identity travels with the user throughout a session, available to every new page visited or function executed by the Data Subset Presentation Engine 206, specific, personalized data subsets can be called from the Central Inventory Data Repository 104 simply by using this and other values as constraints on the user's request. This principle is illustrated in FIG. 5. For example, the following selects from a table inventory the current array of products 612 associated with a user whose employerID=SupplierA, excluding products from SupplierB 614 and SupplierC 616 stored in the same Central Inventory Data Repository 104 where employerID < > (not equal to) SupplierA 610:

```
SELECT
      product_code, product_name, expiration_date, quantity
FROM
      inventory
WHERE
      employerID = 2
```

This is a traditional and common way of deriving subsets of data from a database, limiting access to data to those whose identity permits it. The present invention's innovation is to provide the coordination of these security checks and resulting data sets between multiple buyers and multiple sellers.

2. Log Out
    2.1. Manual. The preferred implementation under this invention also includes a visible control (screen button) and supporting code for terminating a user's session with the system. Once terminated and inactive, the connection cannot be used by any user to access or manipulate the system or data it contains. Because of the aforementioned constant communication of user identity and security key to the system, no module or component the system or its associated data may be accessed or manipulated outside an active session.

2.2. Automatic based on a time interval. Along with the user's identity and security key, the system in this invention places a time stamp in the token or cookie on the user's communication device. With each new transmission of a request to the system, it compares the time value to the central system's time value. If the time stamp on the user's device is less than the time value on the central system by a set interval, then the user is presumed to have been inactive since that time and is logged off automatically.

3. Coordinated Security of User Identities and Data.

3.1. Access to user identities and data. The coordinator or host controls access to user identities and related data. Users can manipulate selected data points within their own and affiliated records in the database (e.g., employees at the same company or department), but they cannot alter the composition or permissions associated with various roles or security keys, and they cannot associate any user with any entity or organization outside their own. (For example, a user from one company cannot be associated with any other company not under control of or related to the first; a user within one division of any organization cannot be associated with any other division, except by those user-administrators with control over both divisions' associations.) Only the coordinator of the system has access to and control over users' affiliation in the system database with unassociated organizations.

3.2. The preferred embodiment of this subsystem of user identities and data is a hosted computer-network server, in a secure environment managed either by the main coordinating party or a separate third-party.

4. Communication Among Parties.

4.1. Messages to trading partner. Preferred embodiment is e-mail message either within the system or from the system to any independent e-mail system (such as Microsoft Outlook), and other embodiments include fax communication transmitted from the system to any outside fax interface, paging systems, mobile phones, and other wireless communications interfaces. The ability to use the system's communications tool and to reach specific other users of the system depends on a user's identity and security keys.

Buyer's Product Management Cycle: Receive, Monitor, Record Use/Sale, Order. Once granted access, the buyer works with the system in a cycle of receiving goods, monitoring, recording use or sale of items, and ordering new items.

1. Receive 1.1. Add. The system maintains a running total of buyer's inventory by incrementing current totals with the addition of new items. The basic process for submitting items to the system for inclusion in the running total of a buyer's inventory is captured in FIG. 3. A Data Collection Device 128, 130, 132, 136, 138, 140 submits a product code for comparison to values in a Product Information Database 200. Using logic in the Data Subset Presentation Engine 206 (described in greater detail below), the system increments the total quantity record for the identified product in the Central Inventory Data Repository 104, for later viewing by authorized system participants via a Communications Interface for Formatting/Viewing Data 142, 144, 146, 148, 150, 152, using presentation logic residing in the Data Subset Presentation Engine 206.

1.2. Identification of products based on full or partial user-provided input. Users increment their inventory records by first identifying the code of the product they wish to add. For the preferred embodiment of this invention, that code is expressed in barcoded format, read by a Data Collection Device 128, 130, 132, 136, 138, 140, for example, a barcode scanner. Two problems work against the accuracy and clarity of the records for the parties sharing the data through this system. First, the codes may be expressed or read inconsistently, even for the same product. "H123" and "+H123-" may represent one product, and "H123A" and "H123B" may represent different unit containers of one product (e.g., 1 in the box for "H123A" and 10 in a case for "H123B"), but storing the different values on behalf of that product in the Central Inventory Data Repository 104 would misrepresent the total quantity, making effective management of inventory impossible. For example, a perceived quantity of "0" of product "H123" may simply reflect the data collection device's preference for passing "+H123-" as that product's identifying code to the Product Information Database 200. The invention protects against this confusion with the measures described below in this section.

1.2.1. Exact match of the user's initial input. The Product Information Database 200 stores values for each unit size of each product within a given marketplace. If the initial code from the Data Collection Device 128, 130, 132, 136, 138, 140 is an exact match of a product ID code in the database, this value is used to update the Central Inventory Data Repository 104, including the incrementing of total quantity of that item.

1.2.2. Parsing of the code from the Data Collection Device 128, 130, 132, 136, 138, 140. If no exact match is found for the initial code, the current embodiment of the invention attempts a series of modifications to that code in a bid to find an exact match with some element of a product record in the Product Information Database 200. For example, the current embodiment of the invention systematically removes characters from the beginning and end of a user-submitted code, such as "+H123-," eventually finding a match with "H123." The eliminates variation in the identification of the item coded "H123."

1.2.3. Multiple matches. Though the Product Information Database 200 enforces uniqueness in product ID codes, the parsing described above may yield multiple matches with records in the Product Information Database 200. If multiple matches are found, the Data Subset Presentation Engine 206 checks the records from the Product Information Database 200 for identical manufacturer and other item identification, indicating a single product type with different packaging sizes. In this case, the Data Subset Presentation Engine 206 favors the lowest available quantity; it offers the alternatives only when necessary for proper tracking of the lowest tracked unit size (e.g., in the case of management by case, carton, or multiple-item container). In the absence of a positive determination of a single product with multiple pack sizes, the Data Subset Presentation Engine 206 returns all possible options, enabling the user to choose.

1.2.4. Automatic determination of product identification requirements. From a comparison of the user-provided product code to a series of user-established preferences for inventory handling (in this embodiment, covering issues such as whether lot number are required for adding a certain product to inventory or the status of the product for consignment purposes), the Data Subset Presentation Engine 206 can selectively request more input from users, to increase the detail of the users portion of the Central Inventory Data Repository 104.

1.2.5. Storage and modification of mutually visible parameters. A buyer's establishment and upkeep of its portion of the Central Inventory Data Repository 104 creates the shared content at the core of this invention. Examples include product identification numbers, lot numbers, expiration dates, storage locations, quantities, etc.

1.2.6. Automatic identification of parameters based on analysis of product coding (e.g., determination of expiration date, point of origin, date of manufacturer, etc. from lot number or serial number barcode). The invention incorporates logic in the Data Subset Presentation Engine 206 to derive from various user-provided data other important product parameters. An embodiment of this logic is the following algorithm excerpt:

```
if len(strUPN_unaltered) = 22 then
    if mid(strUPN_unaltered,15,2) = "10" then
    ' lot number delimeter
        strLot = mid(strUPN_unaltered,17)
        strLot = Replace(strLot, "<", "<")
        strLot = Replace(strLot, ">", ">")
    end if
```

This says, if the length of the users input is 22 characters, and the number "10" occurs in the $15^{th}$ position in the input, then the following characters is a lot number.

1.2.7. Adding an item to inventory in this invention triggers certain routines to determine if additional user interaction is required to initiate some other process within the system. For instance:

If an item is being added to a buyers inventory for the first time, the buyer is given the option of adding details such as the price, par level, internal code, and the necessity for indicating lot number and expiration data on future additions of like products.

If the item is consigned to the buyer by the seller, the Data Subset Presentation Engine 206 can note this fact in the Central Inventory Data Repository 104, to trigger functions by the Data Subset Presentation Engine 206 and change the parameters of display to other system participants through their Communications Interface for Formatting and Viewing Data 142, 144, 146, 148, 150, 152. For example, "consigned" status may move a product to a separate Alert or Viewing function for the supplier of the consigned item.

1.3. Exception handling for product identification. If the user-submitted code is not identified by any effort of the Data Subset Presentation Engine 206.

1.3.1. Initial input not recognized. In this case, the Data Subset Presentation Engine 206 redirects the user to a process that allows the user to submit additional information manually to the Data Subset Presentation Engine 206 (an example in the preferred embodiment is the selection of the product's manufacturer from a list and manual entry via a Data Collection Device 128, 130, 132, 136, 138, 140 of a product catalog number).

1.4. Reconcile. To ensure the values for parameters such as quantity, lot number, and expiration date in the inventory system are accurate, the buyer can use the Data Subset Presentation Engine 206 to compare physical inventory to system inventory. In the Reconcile process, the user submits data from Data Collection Device 128, 130, 132, 136, 138, 140 to the Product Information Database 200, which interprets the data. The Central Inventory Data Repository 104 temporarily stores the new data for comparison to existing records in the Central Inventory Data Repository 104, identifying discrepancies between the physical and virtual inventories and allowing the user to correct those discrepancies through the Data Subset Presentation Engine 206.

1.4.1. Reconcile Order. The contents of incoming shipments, for which order documents were prepared previously using the Data Subset Presentation Engine 206 in tandem with the Central Inventory Data Repository 104, may be reconciled against the expected contents of the order. The addition of products to a current inventory record is subject to all steps in the product identification process described above.

1.5. Acknowledge Order. One-step process that enables a recipient to add to inventory records all products associated with a single order number, simply by acknowledging receipt of a shipment corresponding to that number. Addition of products to a current inventory record is subject to all steps in the product identification process described above.

2. Monitor. Features of the Data Subset Presentation Engine 206, accessed by the Communications Interfaces for Viewing and Transmitting Data 142, 144, 146, 148, 150, 152. View. The buyer's view of detailed inventory data is limited to its own inventory. Buyers may use the invention to create links between their inventories, for shared visibility. In no case can any unauthorized buyer view another buyers inventory.

Figure 6:
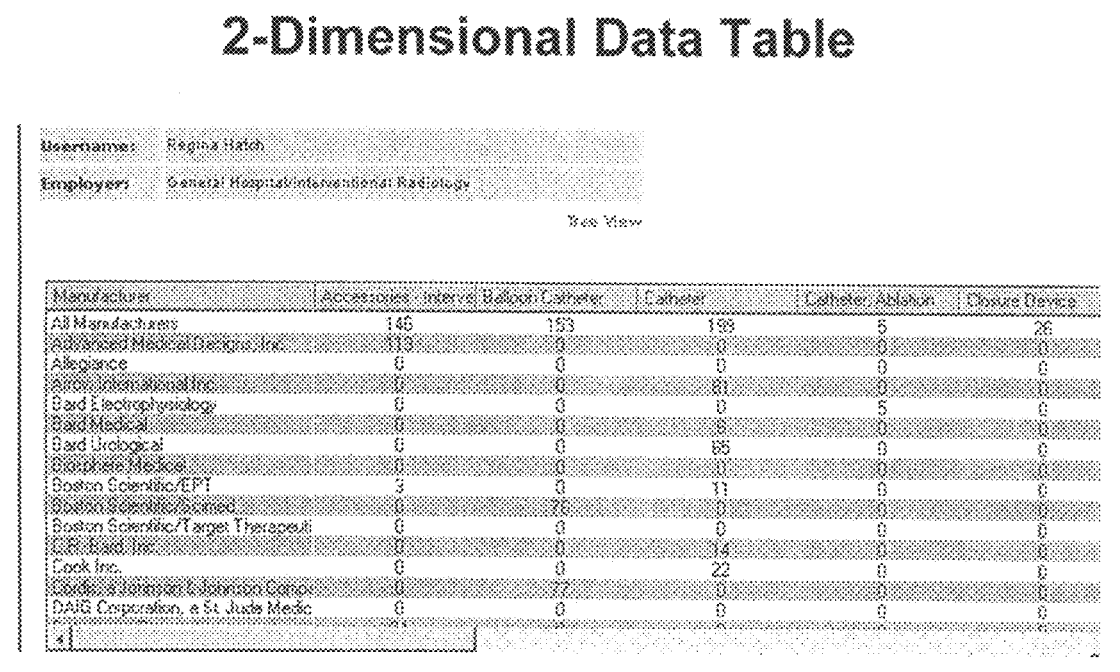
Figure 7:
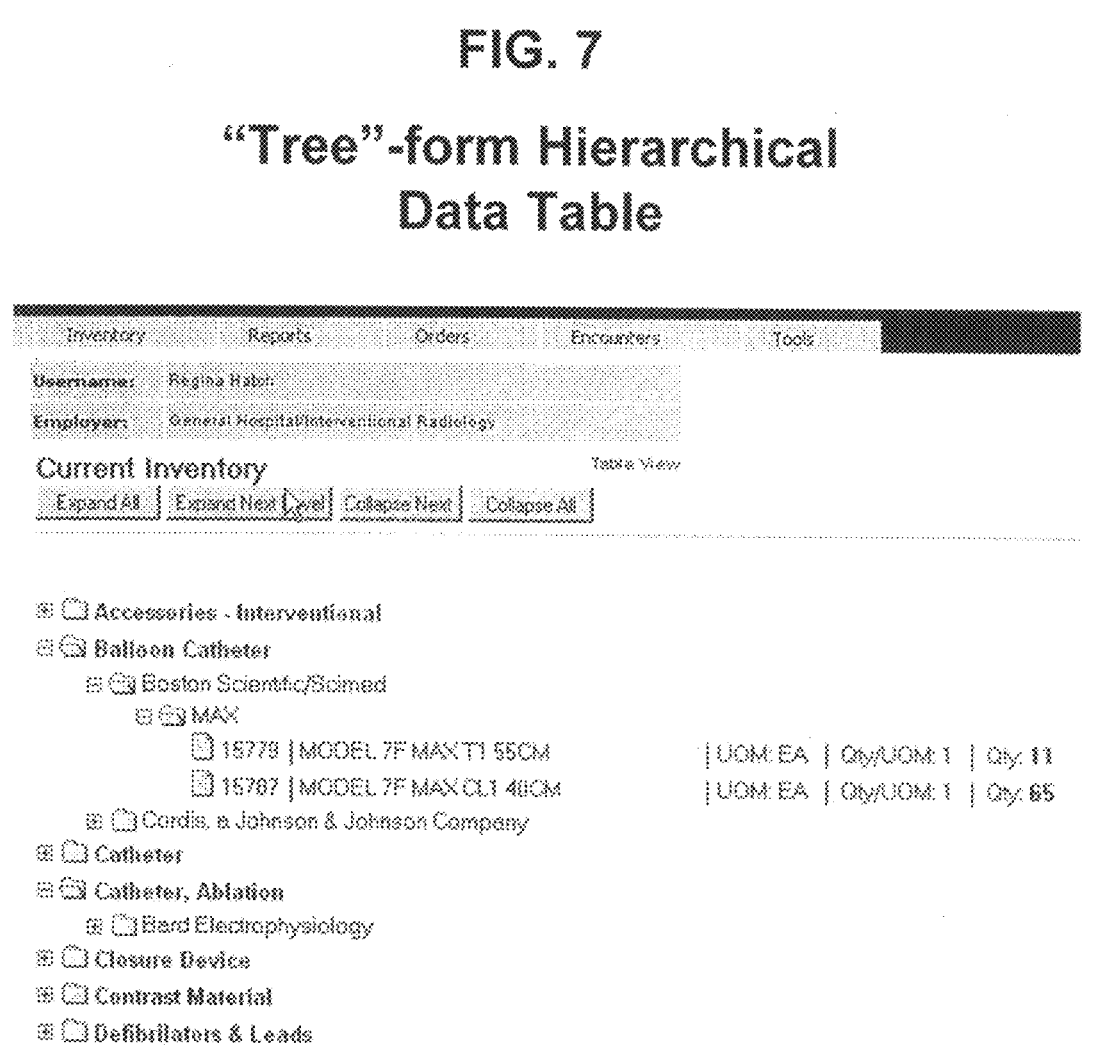

2.1.1. View Customization—format variations. The invention offers the user certain controls for changing the way data is viewed. Examples include selecting between two-dimensional data tables and vertical, hierarchical data trees (FIGS. 6 and 7—images created from screens of a current embodiment of the invention).

2.1.2. View Customization—content variations. The invention allows users to manipulate the data sets to which they have access, by altering the order, number and type of data fields requested from the Data Subset Presentation Engine 206.

2.2. Par Level Creation and Modification. A Buyer's par levels represent ideal stocking levels. At the par level, supply is neither too low, creating a risk of shortages, nor excessive, representing a strain on capital and storage resources.

2.3. Alerts. The Data Subset Presentation Engine 206, acting on continuous comparisons between various values in the Central Inventory Data Repository 104 and user-determined thresholds for differences in those values, automatically sorts alerts, or messages for immediate user attention, into the following types (FIG. 8):

2.3.1. Highlights. Summaries of the other Alerts groupings–total numbers of various types of Alerts.

2.3.2. Low Stock 410. Where current quantity <or =par level−(par level×user's low stock threshold percentage).

2.3.3. Overstock 420. Where current quantity >or =par level+(par level×user's overstock-threshold percentage).

2.3.4. Expired. Where expiration date <today's date.

2.3.5. Nearing Expiration. Where expiration date—users expiration date threshold expressed in months <today's date.

2.3.6. Watch Lists. The relationship between these Alerts ensures that no product is "invisible" to the users on either end of the transaction during the time that it remains "on order," prior to its receipt (see FIG. 8).

2.3.6.1. Low Stock Watch List 430. Where quantity <=par level−(low stock threshold×par level) AND quantity+quantity on order>=par level−(low stock threshold×par level) AND quantity+quantity on order<=par level+(over stock threshold×par level)

2.3.6.2. Overstock Watch List 440. Where quantity <=par level+(over stock threshold×par level) AND quantity+quantity on order>=par level+(over stock threshold×par level)

2.3.6.3. Products on Order 450. Where quantity >par level−(low stock threshold×par level) AND quantity+quantity on order<par level+(over stock threshold×par level) AND quantity on order>0

2.3.7. Consigned Product Used. Alerts Buyers to the usage of a consigned product (one do not yet own but which has been placed with them for use or sale by the supplier, in anticipation that the use or sale of that item will trigger purchase of the item by the buyer from the supplier).

2.4. Search. Subject to the limits established by their individual identities, users may search the Central Inventory Data Repository 104 and Product Information Database 200 using their Communications Interfaces for Viewing and Transmitting Data 142, 144, 146, 148, 150, 152. The Data Subset Presentation Engine 206 interprets and allows manipulation of the results.

2.5. Reports. Reports use the Data Subset Presentation Engine 206 to present a view of a data subset to an authorized user.

2.5.1. Parameters initially set. Reports with parameters initially set do not require the user to interact with software control in the Data Subset Presentation Engine 206 to see an initial result (this result may be customized subsequently).

2.5.2. Parameters set by user through interaction with software. Reports with parameters set by user through interaction with software direct the Data Subset Presentation Engine 206 as to which particular data points the user wishes to see.

2.5.3. Memorized. Any data set presented by the Data Subset Presentation Engine 206 may be saved or "memorized" by the user, for later retrieval.

2.6. Hosting of User-Provided Data. This invention relies in many particulars on sharing a single body of information between multiple buyers and multiple sellers over a common communication platform. However, the preferred embodiment also provides a structure and electronic storage for the internally meaningful data—codes, prices, names, etc.—of participants in the system. The user identity and security key protections ensure that this information is not shared with unauthorized user, though participating organizations may elect to reveal certain data points to certain of their buyers or suppliers.

3. Record Usage/Sale 3.1. Removal. A Data Collection Device 128, 130, 132, 136, 138, 140 passes a code number to the Product Information Database 200 for identification. The identified code is used by the logic in the Data Subset Presentation Engine 206 to decrement the appropriate record in the Central Inventory Data Repository 104. Product identification from the user-provided code relies on processes described in Sections 1.2 and 1.3 above in the Buyer's cycle.

3.2. Detailed Usage/Sale Records (an embodiment is the present invention's Encounters feature). In addition to submitting codes of products to be removed from the running total of items in inventory, the Detailed Usage/Sale Records component enables the buyers, prompted by logic in the Data Subset Presentation Engine 206 pertaining to use or sale of the products (to whom it was sold, under what conditions, at what discount, with what outcomes, etc.) to use a Communications Interface for Formatting and Viewing Data 142, 144, 146, 148, 150, 152 to supplement the record of the removal in the Central Inventory Data Repository 104.

3.2.1. Archive of usage records. The invention provides an information storage platform (preferred embodiment: the Central Inventory Data Repository 104) for subsequent retrieval of a buyer's usage records.

3.3. Consigned product usage and notification. The invention provides tools within the Data Subset Presentation Engine 206 for a buyer to notify a seller about use of and need of replacement for consigned goods through a Communications Interface for Formatting and Viewing Data 142, 144, 146, 148, 150, 152, along with access controls for transferring transaction details to the intended party (appropriate supplier), exclusive of other suppliers.

4. Order 4.1. Automated from Alerts section. The Low Stock Alert described in Section 2.3.2 allows the buyer to use a Communications Interface for Formatting and Viewing Data 142, 144, 146, 148, 150, 152, along with functions contained in the Data Subset Presentation Engine 206, to create orders for entry into other, unrelated systems or for direct transmission, via the Data Subset Presentation Engine 206, to suppliers. In the preferred embodiment, the user selects "order" across from any line item indicated to be in short supply, then selects a "prepare order worksheet" button to retrieve a record from the Central Inventory Data Repository 104 via the Web browser, detailing the number of products to be ordered (the difference between the user's par level and the current quantity, changeable by the user). Once completed, this order worksheet updates the Central Inventory Data Repository 104 to note that the product is on order. In the preferred embodiment, this status is altered either by the user's adding of this product to his inventory record or by the Reconcile Order or Acknowledge Order function contained in the Data Subset Presentation Engine 206.

4.2. Manual. A manual order combines logic for searching the Product Information Database 200, storing details in the Central Inventory Data Repository 104, and communicating those details in the form of an order worksheet to any authorized participants in the system via a Communications Interface for Formatting and Viewing Data 142, 144, 146, 148, 150, 152.

4.3. Standing-order management. Standing orders use details from the Central Inventory Data Repository 104 and order-creation logic from the Data Subset Presentation Engine 206 to prepare repeating, identical (but editable) order worksheets for products presumed to need replenishment in like amounts at regular intervals.

4.4. Archive of order data. Order data is retained for later retrieval in the Central Inventory Data Repository 104. The logic for finding and formatting stored order data is housed in the Data Subset Presentation Engine.

Supplier's Product Management Support Cycle: Monitor. In supporting its customers using this invention—performing such tasks as helping a customer avoid shortages, product spoilage, overstocking, uneven stocking levels of key products, etc.—the supplier uses a Communications Interface for Viewing and Transmitting Data 142, 144, 146, 148, 150, 152 to access data from the buyer's portion of the Central Inventory Data Repository 104. The tools used in this support role, launched from the Data Subset Presentation Engine 206, function identically to those used by buyers. The difference is the range of data available to a supplier.

1. Monitor
   1.1. View. The supplier's access to a broad yet tightly controlled set of buyer data is at the heart of this invention. The supplier sees on his own product at his buyers' location, in real-time, by virtue of a relationship between supplier representatives and buyers, and with the permission of the buyer (granted through selections made through an Internet browser (in the preferred embodiment) in functions stored in the Data Subset Presentation Engine 206, driving modifications in the Central Inventory Data Repository 104). Under no circumstances can one supplier ever view the data or activity of another supplier. The identity and security keys dictate the terms of access through the user's session.
      1.1.1. View Customizations—format and content variations. Suppliers have access to controls for two-dimensional data tables, vertical, hierarchical data trees (FIGS. 6 and 7—images created from screens of a current embodiment of the invention), and other alternatives for customizing their view of permitted data.
   1.2. Alerts. As in Section 2.3 above in the Buyer's Product Management Cycle, but limited to notices about inventory conditions relative to the supplier's own product lines only. This and all other replication of buyer functionality on the supplier side of the invention is accomplished in this embodiment by separate code in the Data Subset Presentation Engine 206 for the supplier. This code performs at least two security checks and formats data from the Central Inventory Data Repository 104 accordingly: it determines the user type of the requestor, and upon determining a user type of "supplier," determines with which supplier the user is affiliated. Only data pertaining to this supplier is available to the user: he can never see data on another supplier's product, from generic parameters such as descriptions or catalog numbers to specifics such as current quantities, sales dates, prices, expiration dates of stocked product, etc.
   1.3. Search. Limited as above by the user's code to data pertaining to his or her organization. In the preferred embodiment (using a Microsoft SQL Server database and the ASP coding language for Internet applications), the dynamic inclusion of a "where" clause (e.g., where manufacturerID=5), drawn from the user's identity, in any database requests performed on the Central Inventory Data Repository 104 by the Data Subset Presentation Engine 206, limits search results to a user's own organization, while providing real-time visibility into buyer inventory levels and other data.
   1.4. Reports. Functions as in 2.5 above for the Buyer's Product Management Cycle, with available data limited by the user's identity and supplier affiliation.

Supplier's Internal (Field-Based) Product Management Cycle: Receive, Monitor, Use/Distribute, Order. These features of one preferred embodiment of the system (an inventory system between multiple buyers and multiple sellers of implantable medical devices) pertain to maintenance of a field-based inventory of products by a supplier's sales or service forces. Sometimes called "trunk stock," this inventory is used for product demonstration or as a limited, widely dispersed distribution channel to satisfy urgent buyer needs.

1. Receive
   1.1. Add. As in Section 1.1 above in the Buyer's Product Management Cycle, but access is limited to the supplier's own product lines. Constrained by a "where" clause that dynamically inserts the supplier-user's supplier (employer) code, the supplier may not call from the Product Information Database 200 or store in the Central Inventory Data Repository 104 any data pertaining to other manufacturer's products.
      1.1.1. Identification of products based on full or partial user-provided input, handling of multiple product code matches and unidentified products codes (exceptions). As in Section 1.2 above in the Buyer's Product Management Cycle, with access limited to the supplier's own product lines.
      1.1.2. Storage of and access to dynamic product parameters from the Central Inventory Data Repository 104 (e.g., quantities, lot numbers expiration dates, par levels, etc.). A supplier may, at its discretion, give its customers visibility into its field-based inventory, using constraints set by the supplier in the Data Subset Presentation Engine 206 (for example, giving customers in the Northeastern U.S. access through a Communications Interface for Formatting and Viewing Data 142, 144, 146, 148, 150, 152 for reviewing available inventory of sales and service representatives covering that territory).
   1.2. Reconcile. As in Section 1.4 above in the Buyer's Product Management Cycle, with access limited to the supplier's own product lines.
   1.3. Acknowledge Order. As in Section 1.5 above in the Buyer's Product Management Cycle, with access limited to the supplier's own product lines.

2. Monitor
   2.1. View. As in Section 2.1 above in the Buyer's Product Management Cycle, with access limited to the suppliers own product lines.
   2.2. Alerts. As in Section 2.3 above in the Buyer's Product Management Cycle, with access limited to the suppliers own product lines and, in one embodiment, the following supplier-specific Alert types.
      2.2.1. To Be Returned—Loan/Trade/Exchanged from Customer. Provides a section in the Alerts function of the Data Subset Presentation Engine 206 that retains a record of any product "added" to a supplier's field-based inventory and recorded in the supplier's portion of the Central Inventory Data Repository 104 that must later be replaced for the buyer from whom the product was obtained. The alert is satisfied and disappears when the product is returned to the customer, an event captured during the subsequent removal of a product from the supplier representative's field-based inventory.
      2.2.2. To Be Received—Bartered/Loaned to Customer. Provides a section in the Alerts function of the Data Subset Presentation Engine 206 that retains a record of any product "removed" from a suppliers field-based inventory and recorded in the supplier's portion of the Central Inventory Data Repository 104 that must later be recovered from or replaced by the buyer who received the product. The alert is satisfied and disappears when the product is retrieved from the customer, an event captured during the subsequent addition of a product to the supplier representative's field-based inventory.

2.3. Search. As in Section 2.4 above in the Buyer's Product Management Cycle, with access limited to the supplier's own product lines.

2.4. Reports. As in Section 2.5 above in the Buyer's Product Management Cycle, with access limited to the supplier's own product lines.

3. Record Usage/Sale 3.1. Removal. As in Section 3.1 above in the Buyer's Product Management Cycle, with access limited to the supplier's own product lines.

3.2. Detailed Usage/Sale Records (an embodiment is the present invention's Sales Disposition feature). As in Section 3.2 above in the Buyer's Product Management Cycle, with access limited to the supplier's own product lines.

4. Order 4.1. Automated from Alerts section. As in Section 4.1 above in the Buyer's Product Management Cycle, with access limited to the suppliers own product lines.

4.2. Manual. As in Section 4.2 above in the Buyer's Product Management Cycle, with access limited to the supplier's own product lines.

4.3. Standing order management. As in Section 4.3 above in the Buyer's Product Management Cycle, with access limited to the supplier's own product lines.

4.4. Archive of order data. As in Section 4.4 above in the Buyer's Product Management Cycle, with access limited to the supplier's own product lines.

Intermediary's (Coordinator's) Management Cycle: Setup, Review, Resolve. The system coordinator maintains a series of controls over data relationships between the participating buyers and sellers, maintains the accuracy and integrity of data in the Product Information Database 200 and Central Inventory Data Repository 104, and assigns and secures the identities, roles, and permissions of system users, which are stored in the Central Inventory Data Repository 104.

1. Setup.

1.1. Creating links for shared visibility. Certain logic in the Data Subset Presentation Engine 206 relies on coded relationships between parties to determine access to information. One example in the present embodiment may be access by a user within one department of an organization to the data records regarding inventory or personnel of another department in the same organization. Another might be real-time access, via a Communications Interface for Formatting and Viewing Data 142, 144, 146, 148, 150, 152, to buyer inventory data in the Central Inventory Data Repository 104 for the representative of a supplier to that buyer. A preferred embodiment of security for these restrictions is the access security described above in the Security and Access Control section, in addition to a system for encryption (Secure Socket Layer is an embodiment) of data traveling across a common communications system (e.g., the Internet).

2. Review. A preferred embodiment of the invention provides a dedicated interface for the coordinating party or intermediary, with logic and controls residing in the Data Subset Presentation Engine 206. The interface provides broad access to the Central Inventory Data Repository 104 and Product Information Database 200 for the coordinator and its representatives, subject to password protection and security key checking. In the preferred embodiment, these passwords are encrypted so as not to be human readable, and therefore unknown to all users but their owner.

3. Resolve. In addition to simple "viewing" access, the preferred embodiment of this invention provides tools within the Data Subset Presentation Engine 206 for the coordinator's representatives to resolve data issues and maintain and modify both the Central Inventory Data Repository 104 and the Product Information Database 200. These issues includes but are not limited to correcting erroneous product data, clearing passwords, altering database structure in the Product Information Database 200 or logical structure in the Data Subset Presentation Engine 206, and modifying links between participants in the system, which are then stored in the Central Inventory Data Repository 104 to be referenced by logic residing in the Data Subset Presentation Engine 206.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. A computer implemented method for transferring commerce-related information between multiple buyers and multiple vendors, comprising:

electronically connecting, via a computer link, a plurality of unrelated buyers and a plurality of vendors to access the information;

wherein the information for each buyer is stored electronically on a buyer data collection device; and wherein each buyer is prohibited from accessing the information of another buyer;

receiving information via the computer link, corresponding to one or more products from one or more of the vendors, the information characterizing the one or more products and being of a static nature;

storing the information on an electronic database independent from the one or more buyers;

receiving a request for a portion of the stored information;

retrieving the portion of the stored information corresponding to the request;

using the retrieved portion of the stored information to maintain a dynamic record of product parameters;

signaling an authorization to the one or more vendors to access the dynamic record of product parameters;

providing to the one or more of the buyers access to the dynamic record of product parameters of the one or more products;

providing to one or more of the vendors, according to pre-authorized permissions, selective access to the dynamic record of product parameters of the one or more products; and providing a communication link accessible to one or more of the vendors and buyers to initiate a specific inventory action related to the dynamic record of product parameters.

2. The method of claim 1, further comprising providing access between at least one of the buyers and at least one of the vendors.

3. A computer implemented inventory management system, comprising:

a central node, configured to electronically couple a plurality of vendors and a plurality of unrelated buyers; and a first database and a second database electronically coupled to the central node;

wherein each buyer has an electronic data collection device to collect inventory information;

wherein the first database includes product information from the vendors related to product characteristics and being of a static nature and the second database includes inventory information related to dynamic product totals;

wherein the central node is independent from the plurality of buyers and the plurality of vendors, and provides a communication link accessible to the plurality of vendors and buyers to initiate an inventory request related to one or more products;

wherein when a request from one of the plurality of vendors and the plurality of buyers is received at the central node which system obtains information stored on the first database from at least one of the plurality of vendors and in response to the request uses a subset of said information in combination with the inventory information from the second database for selective access by and display to one of the plurality of vendors and the plurality of buyers according to predetermined permissions; and wherein the central node facilitates a re-supply of inventory by one or more of the plurality of vendors in response to a determination that the inventory has dropped below a predetermined re-supply level without further authorization.

4. The method of claim 1 wherein the static information includes product information.

5. The method of claim 1 wherein the access to the stored information is granted to one or more of the buyers.

6. The method of claim 1 wherein access to the stored information is granted to one or more of the vendors.

7. The method of claim 1 wherein the stored information includes the inventory of one or more of the buyers and access is provided to one or more of the vendors.

8. The method of claim 1 wherein the inventory is of one or more of the vendors and access is provided to one or more of the buyers.

9. The method of claim 1 further comprising:
setting of one or more predetermined product re-supply thresholds for each of the buyers.

10. The method of claim 9 further comprising:
electronically initiating a re-supply action of inventory when one or more of the predetermined product re-supply thresholds are met.

11. A computer implemented method for a vendor to manage inventory of two or more customers, comprising:
establishing an electronic communication link with a central, independent database with an electronic connection to an inventory collection device at each of multiple, independent customers;
acquiring information related to inventory of one or more products of each of the two or more unrelated customers via a computer link to the inventory collection device of the customer;
obtaining pre-authorization to re-supply the one or more products when inventory of the one or more products drops below a predetermined re-supply level; and
managing the inventory comprising the steps of:
accessing the acquired information storable on an electronic database via a computer link; and
initiating a re-supply action by the vendor in response to a determination that the inventory has dropped below the predetermined re-supply level of the product without further authorization.

12. A method for sharing inventory via a computer link related to medical products information between multiple independent buyers and multiple independent vendors, comprising:
establishing an electronic communication link with a central, independent database with an electronic connection to an inventory collection device at each of the multiple, unrelated customers;
wherein each buyer is prevented from accessing the inventory collection device of an unrelated buyer; and
wherein the inventory collection device comprises inventory information, the information characterizing the supply and use of the one or more products and being of a static nature;
receiving via a computer link inventory information corresponding to one or more medical products from one or more of the multiple buyers;
storing the information on an independent, electronic medium;
receiving a request for a portion of the stored information;
retrieving the portion of the stored information corresponding to the request;
using the retrieved portion of the stored information to maintain a dynamic record of product parameters;
signaling authorization to one or more vendors to access the dynamic record of product parameters;
providing to one or more of the multiple vendors, according to pre-authorized permissions, selective access to the dynamic record of product parameters of the one or more products; and
allowing for a responsive action initiated by the multiple vendors related to the dynamic record of product parameters without further authorization, and
updating the dynamic record of product parameters.

13. The method of claim 12, wherein the inventory is labile in nature or subject to obsolescence.

14. The method of claim 1, wherein the one or more products are medical products.

15. The system of claim 3, wherein the product is a medical product.

16. The system of claim 3, wherein the vendor makes determination that the inventory has dropped below a predetermined re-supply level without further authorization and initiates the re-supply.

17. The system of claim 11, wherein the vendor makes determination that the inventory has dropped below a predetermined re-supply level.

18. A system comprising:
a data structure stored thereon adapted and configured to route signals, wherein the data structure comprises a computer readable system for inventory management comprising:
a processing system configured and adapted to communicate with a plurality of computers, wherein the processing system is arranged to accept input of:
a central node, configured to electronically couple a plurality of vendors and a plurality of unrelated buyers; and
a first database and a second database electronically coupled to the central node;
wherein each buyer has an electronic data collection system to collect inventory information;
wherein the first database includes product information from the vendors related to product characteristics and being of a static nature and the second database includes inventory information related to dynamic product totals;

wherein the central node is independent from the plurality of buyers and the plurality of vendors, and provides a communication link accessible to the plurality of vendors and buyers to initiate an inventory request related to one or more products;

wherein when a request from one of the plurality of vendors and the plurality of buyers is received at the central node which system obtains information stored on the first database from at least one of the plurality of vendors and in response to the request uses a subset of said information in combination with the inventory information from the second database for selective access by and display to one of the plurality of vendors and the plurality of buyers according to predetermined permissions; and wherein the central node facilitates a re-supply of inventory by one or more of the plurality of vendors in response to a determination that the inventory has dropped below a predetermined re-supply level without further authorization.

19. The method of claim 10 further comprising:

accounting for the re-supply action via a billing event transmittable to the one or more vendors or the one or more buyers.

20. A system for transferring information between multiple buyers and multiple vendors, comprising:

means for electronically connecting via a computer link a plurality of unrelated buyers and a plurality of vendors to access the information;

wherein the information of each buyer is stored electronically on a buyer data collection device; and wherein each buyer is prohibited from accessing the information of another buyer;

means for receiving information via computer link, corresponding to one or more products from one or more of the vendors, the information characterizing the one or more products and being of a static nature;

means for storing the information on an electronic database independent from the one or more buyers;

means for receiving a request for a portion of the stored information;

means for retrieving the portion of the stored information corresponding to the request;

means for using the retrieved portion of the stored information to maintain a dynamic record of product parameters;

means for signaling authorization to one or more vendors to access the dynamic record of product parameters;

means for providing to one or more of the buyers access to the dynamic record of product parameters of the one or more products;

means for providing to one or more of the vendors, according to pre-authorized permissions, selective access to the dynamic record of product parameters of the one or more products; and means for providing a communication link accessible to one or more of the vendors and buyers to initiate a specific inventory action related to the dynamic record of product parameters.

21. The system of claim 3, wherein each buyer is prohibited from accessing the information of another buyer.

* * * * *

UNITED STATES PATENT AND TRADEMARK OFFICE
CERTIFICATE OF CORRECTION

PATENT NO. : 7,711,603 B2  Page 1 of 1
APPLICATION NO. : 11/823589
DATED : May 4, 2010
INVENTOR(S) : Vanker et al.

It is certified that error appears in the above-identified patent and that said Letters Patent is hereby corrected as shown below:

Title Page:
Before Item (51), insert the following:

--Related U.S. Application Data
(63)  Continuation of application no. 10/810,353, filed on Mar. 26, 2004, now abandoned, which is a continuation of application no. 10/050,615, now abandoned.

(60)  Provisional application no. 60/262,182, filed on Jan. 17, 2001; and provisional application no. 60/262,184, filed on Jan. 17, 2001. --

Signed and Sealed this

Seventh Day of December, 2010

David J. Kappos
*Director of the United States Patent and Trademark Office*